(12) United States Patent  (10) Patent No.: US 11,856,166 B2
Kimura  (45) Date of Patent: Dec. 26, 2023

(54) IMAGE READING APPARATUS WHICH PREVENTS DAMAGE TO DOCUMENTS TO BE READ WHICH ARE THICKER THAN REGULAR PAPER

(71) Applicant: KYOCERA Document Solutions Inc., Osaka (JP)

(72) Inventor: Shinichi Kimura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/006,114

(22) PCT Filed: Jul. 19, 2021

(86) PCT No.: PCT/JP2021/026912
§ 371 (c)(1),
(2) Date: Jan. 19, 2023

(87) PCT Pub. No.: WO2022/019250
PCT Pub. Date: Jan. 27, 2022

(65) Prior Publication Data
US 2023/0283727 A1   Sep. 7, 2023

(30) Foreign Application Priority Data
Jul. 21, 2020 (JP) ................................. 2020-124552

(51) Int. Cl.
*H04N 1/00* (2006.01)

(52) U.S. Cl.
CPC ..... *H04N 1/00806* (2013.01); *H04N 1/00602* (2013.01); *H04N 1/00615* (2013.01); *H04N 1/00705* (2013.01); *H04N 1/00716* (2013.01); *H04N 1/00745* (2013.01); *H04N 1/00814* (2013.01); *H04N 1/00824* (2013.01)

(58) Field of Classification Search
None
See application file for complete search history.

(56) References Cited

U.S. PATENT DOCUMENTS

2019/0052767 A1* 2/2019 Nagano .............. H04N 1/00816
2020/0236234 A1* 7/2020 Suetani ............. H04N 1/32657

FOREIGN PATENT DOCUMENTS

| JP | 2003-069792 A | 3/2003 |
| JP | 2013-026874 A | 2/2013 |
| JP | 2019-033413 A | 2/2019 |

* cited by examiner

*Primary Examiner* — Andrew H Lam
(74) *Attorney, Agent, or Firm* — Stein IP, LLC (57) ABSTRACT

A conveyance path for a document (D) has a first conveyance path (R1) that turns back midway and a second conveyance path (R2) that extends rectilinearly. When the document (D) is of a particular type, if a setting to use the first conveyance path (R1) has been made, a control section (4) has a warning message (MS1) displayed.

8 Claims, 8 Drawing Sheets

IMAGE READING APPARATUS WHICH PREVENTS DAMAGE TO DOCUMENTS TO BE READ WHICH ARE THICKER THAN REGULAR PAPER

CROSS-REFERENCE TO RELATED APPLICATIONS

This application is a national stage of International Application No. PCT/JP2021/026912, filed Jul. 19, 2021, which claims the benefit of Japanese Application No. 2020-124552, filed Jul. 21, 2020, in the Japanese Patent Office, the disclosures of which are incorporated herein by reference.

TECHNICAL FIELD

The present invention relates to image reading apparatuses for reading a document.

BACKGROUND ART

Known image reading apparatuses can perform a conveying-reading job to read a document being conveyed. One example of such image reading apparatuses is seen in Patent Document 1.

The image reading apparatus of Patent Document 1 has two conveyance paths for documents. One conveyance path is partly curved, so when this conveyance path is used, the document is bent. The other conveyance path extends rectilinearly.

According to Patent Document 1, particular types of documents that are thicker and stiffer than regular paper, for example, cardboard sheets and plastic cards, can be conveyed. That is, according to Patent Document 1, such particular types of documents can be read in a conveying-reading job. For the reading of particular types of documents, the rectilinearly extending conveyance path is used.

CITATION LIST

Patent Literature

Patent Document 1: JP-A-2013-26874

SUMMARY OF INVENTION

Technical Problem

When the document to be read in a conveying-reading job is of a particular type, if the partly curved conveyance path is used, the document may be damaged. To avoid that, when the target of reading is a document of a particular type, it is preferable to use the rectilinearly extending conveyance path.

Depending on the user, however, when choosing the conveyance path to be used in a conveying-reading job, he may by mistake choose the partly curved conveyance path despite the target of reading being a document of a particular type. This may lead to the document being damaged.

Devised to solve the problems mentioned above, the present invention is aimed at providing, as an image reading apparatus configured to be able to perform a job of reading, while conveying, a particular type of document thicker and stiffer than regular paper, one that can prevent damage to the particular type of document.

Solution to Problem

To achieve the above aim, according to one aspect of the present invention, an image reading apparatus includes: an operation panel for receiving settings for a reading job whereby a document is read to generate image data; a document conveyance unit having a document conveyance passage for guiding a job document to be read in the reading job, the document conveyance unit feeding the job document to the document conveyance passage to convey the job document; and a control section for controlling the reading job according to the settings for the reading job received by the operation panel. The conveyance path for the job document is either a first conveyance path extending from one side to another side and then turning midway to extend back to the one side or a second conveyance path extending rectilinearly without turning back midway. When the job document is of a particular type other than regular paper, if a setting to use the first conveyance path has been made, before performing the reading job, the control section makes the operation panel display a warning message.

Advantageous Effects of Invention

According to the present invention, it is possible to provide, as an image reading apparatus configured to be able to perform a job of reading, while conveying, a particular type of document thicker and stiffer than regular paper, one that can prevent damage to the particular type of document.

DESCRIPTION OF EMBODIMENTS

<Configuration of a Multifunction Peripheral>

Figure 1:
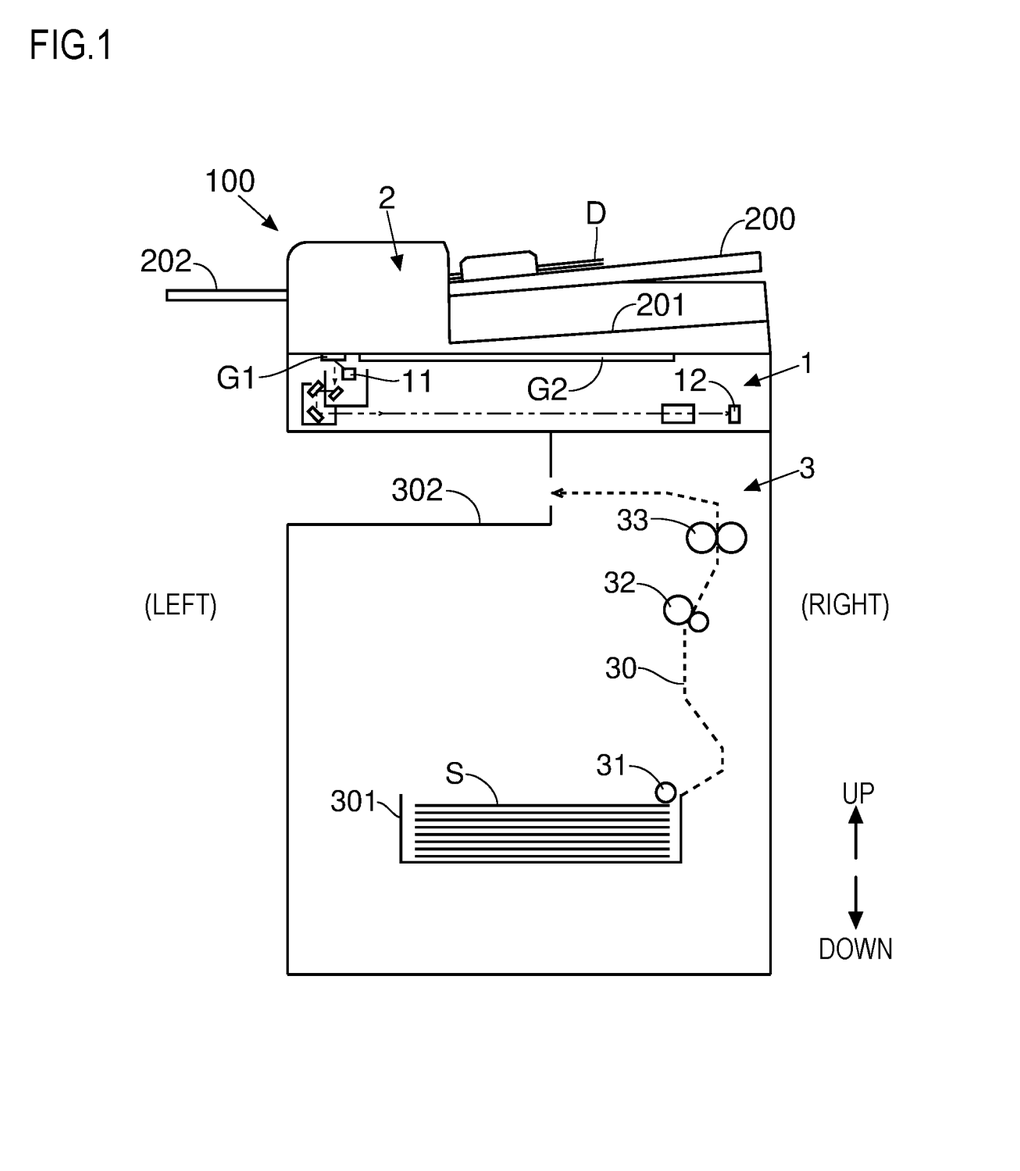
FIG. 1 is a schematic diagram of a multifunction peripheral according to an embodiment of the present invention.

As shown in FIG. 1, a multifunction peripheral 100 (corresponding to an "image reading apparatus") according to an embodiment includes a reading section 1. The reading section 1 reads a document D.

The reading section 1 includes a light source 11 and an image sensor 12. The light source 11 shines light on the document D. The image sensor 12 receives and photoelectrically converts the light reflected from the document D. The light source 11 and the image sensor 12 are disposed inside the housing of the reading section 1.

The top surface of the housing of the reading section 1 is fitted with contact glasses G1 and G2. The contact glass G1 is used in a conveying-reading job. The contact glass G2 is used in a placed-reading job.

The multifunction peripheral 100 includes a document conveyance unit 2. The document conveyance unit 2 is pivotably fitted to the housing of the reading section 1. The document conveyance unit 2 includes a document tray 200 and a first discharge tray 201. The document conveyance unit 2 also includes a second discharge tray 202.

The document tray 200 is located at one side (at the right side as seen from in front of the multifunction peripheral 100). The first discharge tray 201 is located at the one side, below the document tray 200. The second discharge tray 202 is located at the other side (at the left side as seen from in front of the multifunction peripheral 100) opposite from the one side.

Figure 2:
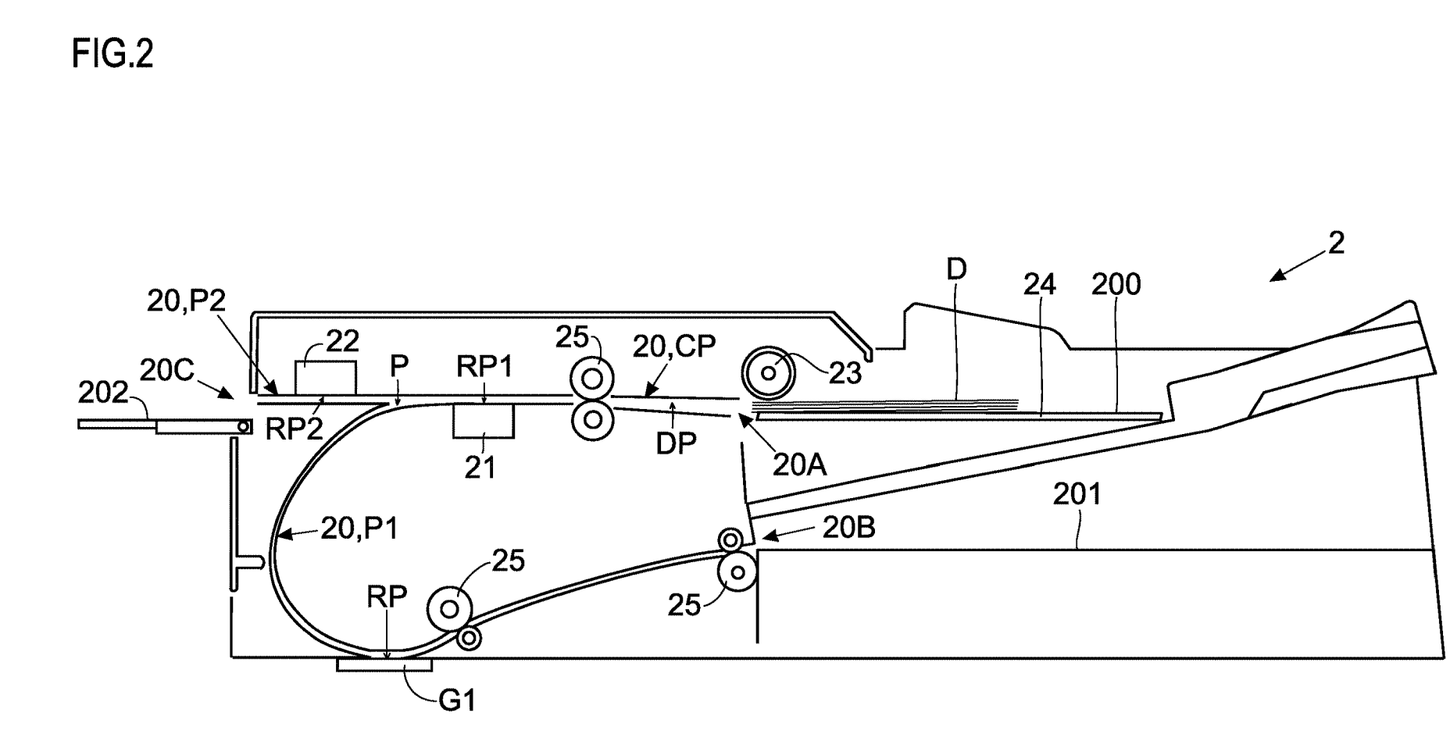
FIG. 2 is a schematic diagram of a document conveyance unit in the multifunction peripheral according to the embodiment of the present invention.

As shown in FIG. 2, the document conveyance unit 2 has a document conveyance passage 20 that guides the conveyance of a document D to be read in a conveying-reading job. The document conveyance unit 2 feeds the document D, which is stored in the document tray 200, to the document conveyance passage 20 and then conveys the document D. The document conveyance unit 2 then discharges the document D to either the first discharge tray 201 or the second discharge tray 202.

In the following description, the feed port through which the document D is fed from the document tray 200 to the document conveyance passage 20 is identified by the symbol 20A. The discharge port through which the document D is discharged from the document conveyance passage 20 to the first discharge tray 201 is identified by the symbol 20B. The discharge port through which the document D is discharged from the document conveyance passage 20 to the second discharge tray 202 is identified by the symbol 20C.

The second discharge tray 202 is pivotably fitted to the document conveyance unit 2. The second discharge tray 202 pivots between an open position (the position shown in FIG. 2) and a closed position (not shown). In the open position, the second discharge tray 202 keeps the discharge port 20C open. When closed, the second discharge tray 202 closes the discharge port 20C. Thus, the second discharge tray 202 corresponds to a "cover".

Figure 3:
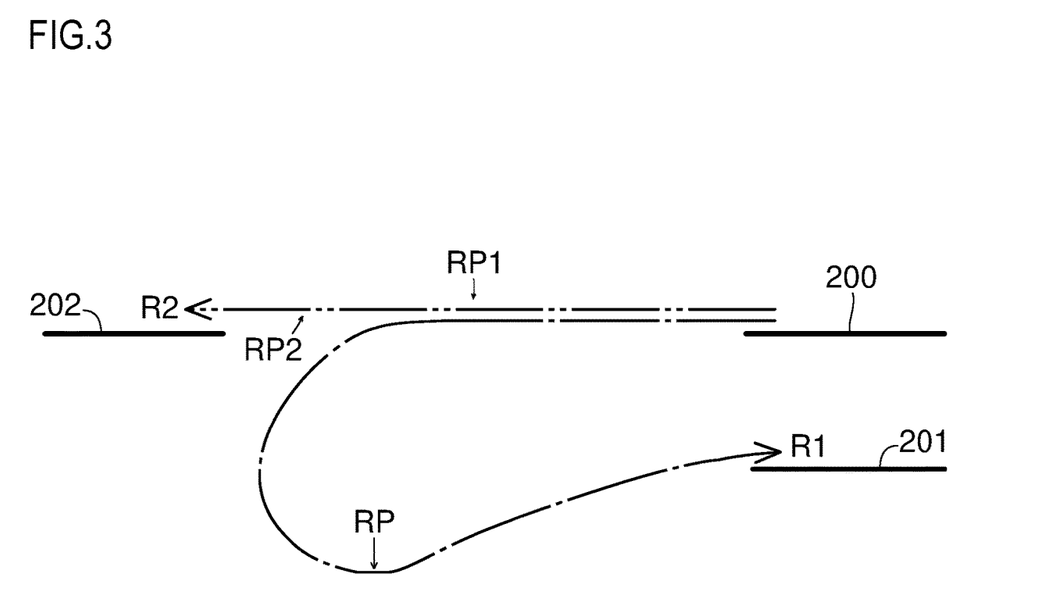
FIG. 3 is a diagram showing conveyance paths for a document conveyed by document conveyance unit in the multifunction peripheral according to the embodiment of the present invention.

There are two conveyance paths for the conveyance of the document D by the document conveyance unit 2 conveys. The document conveyance unit 2 conveys the document D along either a first conveyance path R1 (see FIG. 3) or a second conveyance path R2 (see FIG. 3). In FIG. 3, the first conveyance path R1 is indicated by a dash-and-dot line, and the second conveyance path R2 is indicated by a dash-dot-dot line. FIG. 2 does not show either of the first and second conveyance paths R1 and R2.

The first conveyance path R1 starts at the sheet feed port 20A of the document conveyance passage 20, and ends at the discharge port 20B of the document conveyance passage 20. The first conveyance path R1 extends from one side (right side) of the document conveyance unit 2 to its other side (left side), and turns midway to extend back to the one side. In other words, the first conveyance path R1 is, in one part of it, curved substantially in a U shape. When using the first conveyance path R1, the document conveyance unit 2 feeds the document D from the document tray 200 to the document conveyance passage 20, and discharges the document D to the first discharge tray 201.

The second conveyance path R2 starts at the sheet feed port 20A of the document conveyance passage 20, and ends at the discharge port 20C of the document conveyance passage 20. The first and second conveyance paths R1 and R2 start at the same place. The second conveyance path R2 extends rectilinearly from one side (right side) of the document conveyance unit 2 to its other side (left side). Unlike the first conveyance path R1, the second conveyance path R2 does not turn back midway. When using the second conveyance path R2, the document conveyance unit 2 feeds the document D from the document conveyance passage 20 to the document conveyance passage 20, and discharges the document D to the second discharge tray 202.

As shown in FIG. 2, the document conveyance passage 20 has a common portion CP. The common portion CP is the part of the document conveyance passage 20 from the sheet feed port 20A to a branch position P. At the branch position P, the document conveyance passage 20 branches into a first portion P1 and a second portion P2. The first portion P1 leads from the branch position P to the first discharge tray 201. The second portion P2 leads from the branch position P to the second discharge tray 202. The conveyance path for the document D that leads from the document tray 200 via the common portion CP and the first portion P1 to the first discharge tray 201 is the first conveyance path R1. The conveyance path for the document D that leads from the document tray 200 via the common portion CP and the second portion P2 to the second discharge tray 202 is the second conveyance path R2.

The first conveyance path R1 passes across reading positions RP1 and RP in this order. The second conveyance path R2 passes across the reading positions RP1 and RP2 in this order.

The reading position RP is located on the contact glass G1. At the reading position RP, the reading section 1 performs reading.

At the reading positions RP1 and RP2, there are provided reading sensors 21 and 22 respectively. The reading sensors 21 and 22 are CISs (contact image sensors). The reading sensor 21 performs reading at the reading position RP1. The reading sensor 22 performs reading at the reading position RP2.

The document conveyance unit 2 includes a sheet feed roller 23. The sheet feed roller 23 is disposed at the sheet feed port 20A of the document conveyance passage 20. The sheet feed roller 23 makes contact with the document D placed on the document tray 200, and rotates in that state. As a result, the document D is fed from the document tray 200 to the document conveyance passage 20.

The document tray 200 includes a lift plate 24. The document D on the document tray 200 is placed on the lift plate 24. The lift plate 24 has a pivoting fulcrum at one side (right side) in the sheet feed direction. The lift plate 24 pivots in such a way that an end part of it at the other side (left side) swings up and down. The lift plate 24 rises to keep the document D on the document tray 200 in contact with the sheet feed roller 23.

Along the document conveyance passage 20, a plurality of pairs of conveyance rollers 25 are disposed. Each pair of conveyance rollers 25 includes a driving roller and a driven roller. The driving and driven rollers stay in pressed contact with each other to form a conveyance nip. Each pair of conveyance rollers 25, by rotating, conveys the document D that has entered the conveyance nip.

When a job to be performed is a conveying-reading job, the document D is placed on the document tray 200. The document conveyance unit 2 feeds the document D on the document tray 200 to the document conveyance passage 20 and conveys the document D. In a conveying-reading job, the document D being conveyed is read to produce the image data of the document D.

When a job to be performed is a placed-reading job, the document D is placed on the contact glass G2. In a placed-reading job, the document D placed on the contact glass G2 is read by the reading section 1 to produce the image data of the document D.

Here, a placed-reading job is performed in either a first mode or a second mode. The first mode is a mode that employs the first conveyance path R1. The second mode is a mode that employs the second conveyance path R2.

When a placed-reading job is performed in the first mode, the document conveyance unit 2 conveys the document D along the first conveyance path R1. While the document D being conveyed is passing across the reading position RP, the reading section 1 reads the obverse side of the document D (its surface facing up on the document tray 200). In duplex reading, not only the reading section 1 but also the reading sensor 21 performs reading. While the document D being conveyed is passing across the reading position RP1, the reading sensor 21 reads the reverse side of the document D (its surface facing down on the document tray 200).

When a conveying-reading job is performed in the second mode, the document conveyance unit 2 conveys the document D along the second conveyance path R2. While the document D being conveyed is passing across the reading position RP2, the reading sensor 22 reads the obverse side of the document D. In duplex reading, not only the reading sensor 22 but also the reading sensor 21 performs reading. While the document D being conveyed is passing across the reading position RP1, the reading sensor 21 reads the reverse side of the document D.

A user can freely choose the mode of a conveying-reading job. For example, the default mode is the first mode. Generally, when the document D is regular paper, the user chooses the first mode.

When the document D is of a particular type other than regular paper, the recommended mode is the second mode. Accordingly, when the document D is of a particular type, the user chooses the second mode. A document D of a particular type can be, for example, a cardboard sheet, a plastic card, a business card, or a glossy paper sheet. That is, a document D of a particular type is thicker and stiffer than regular paper. Accordingly, when the document D is of a particular type, the second mode, which permits the document D to be conveyed without being bent, is recommended.

Referring back to FIG. 1. the multifunction peripheral 100 includes a printing section 3. The printing section 3 conveys a sheet S along a sheet conveyance passage 30 (indicated by a broken line in FIG. 1). The printing section 3 prints an image on the sheet S being conveyed. For example, the printing section 3 forms, as the image printed on the sheet S, an image based on image data acquired in a reading job.

The printing section 3 includes a sheet feed section 31. Sheets S to be used in printing are stored in a sheet cassette 301. The sheet feed section 31 feeds a sheet S from the sheet cassette 301 to the sheet conveyance passage 30.

The printing section 3 includes a transfer section 32. The transfer section 32 includes a photosensitive drum and a transfer roller. The photosensitive drum carries a toner image on its circumferential surface. The transfer roller stays in pressed contact with the photosensitive drum to form a transfer nip against it. The transfer section 32, while conveying the sheet S that has entered the transfer nip, transfers the toner image to the sheet S.

The printing section 3 further includes, though not illustrated, a charging device, an exposure device, and a developing device. The charging device electrostatically charges the circumferential surface of the photosensitive drum. The exposure device forms an electrostatic latent image on the circumferential surface of the photosensitive drum. The developing device develops the electrostatic latent image on the circumferential surface of the photosensitive drum into a toner image.

The printing section 3 also includes a fixing section 33. The fixing section 33 includes a heating roller and a pressing roller. The heating roller incorporates a heater. The pressing roller stays in pressed contact with the heating roller to form a fixing nip against it. The fixing section 33, while conveying the sheet S that has entered the fixing nip, fixes the toner image to the sheet S. The sheet S having undergone printing is discharged to a sheet discharge tray 302.

Figure 4:
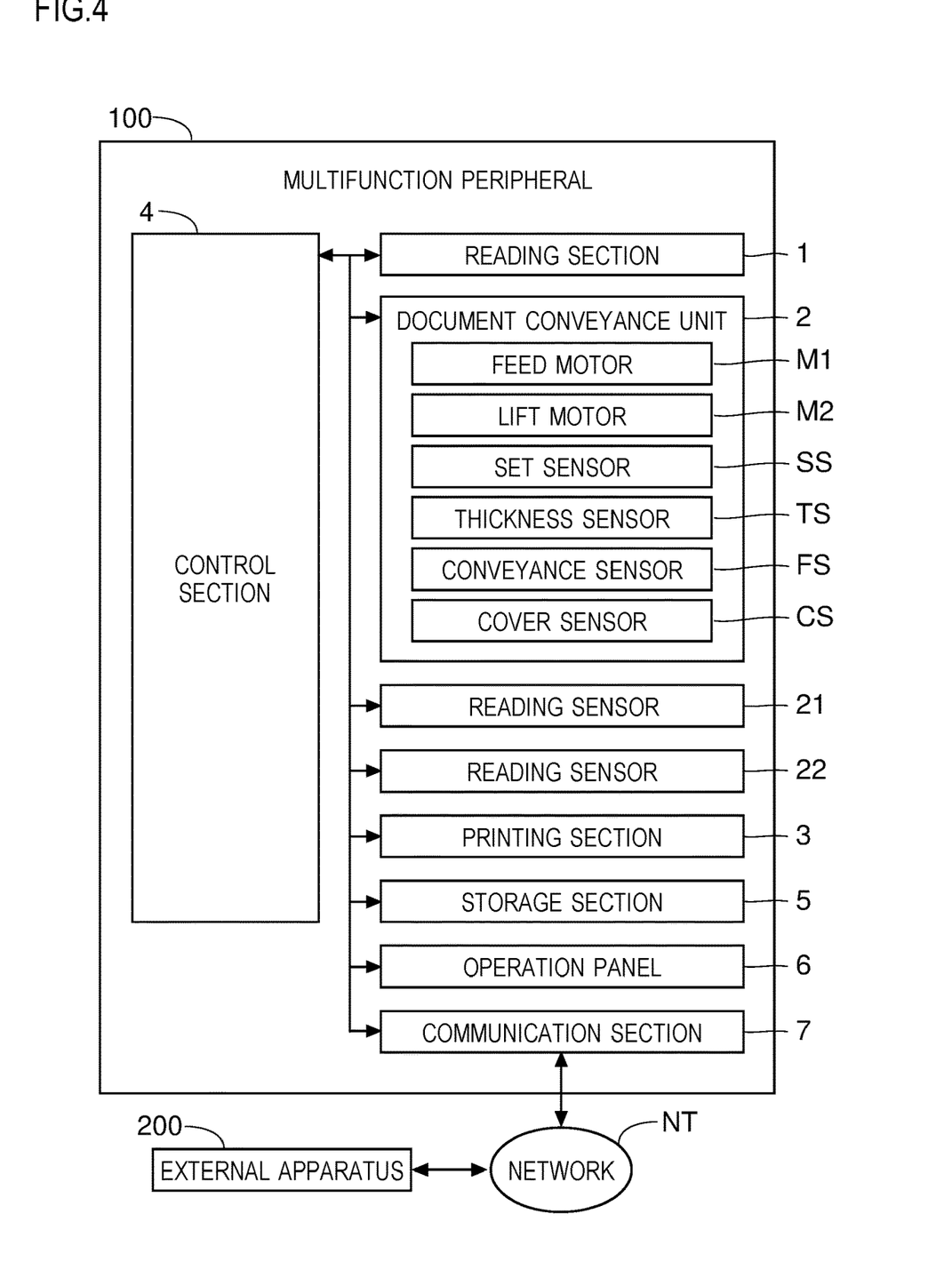
FIG. 4 is a block diagram of the multifunction peripheral according to the embodiment of the present invention.

As shown in FIG. 4, the multifunction peripheral 100 also includes a control section 4 and a storage section 5. The control section 4 includes a CPU. The storage section 5 includes storage devices such as a ROM, a RAM, and a HDD. The control section 4 controls the jobs, such as a reading job and a printing job, performed on the multifunction peripheral 100.

The control section 4 controls the reading operation of the reading section 1. The control section 4 controls the conveying operation of the document conveyance unit 2 with respect to the document D. That is, the control section 4 controls a feed motor M1 that rotates different roller members, such as the sheet feed roller 23, for feeding the document D. The control section 4 controls a lift motor M2 for raising and lowering the lift plate 24. The control section 4 controls the reading operation of the reading sensors 21 and 22.

A set sensor SS is connected to the control section 4. The set sensor SS is disposed on the document tray 200. The set sensor SS changes its output value according to the presence or absence of a document D on the document tray 200. Based on the output of the set sensor SS, the control section 4 senses whether a document D is placed on the document tray 200 (whether there is any document D left on the document tray 200).

A thickness sensor TS is also connected to the control section 4. The thickness sensor TS is an ultrasonic sensor. The thickness sensor TS has a transmitter that transmits an ultrasonic wave and a receiver that receives the ultrasonic wave. The thickness sensor TS changes its output value according to the amount of ultrasonic wave that is transmitted from the transmitter to the receiver.

The thickness sensor TS has its sensing position at a position DP2 (see FIG. 2) upstream, in the document conveyance direction, of the branch position P in the document conveyance passage 20. That is, the sensing position DP of the thickness sensor TS is located in the common portion CP of the document conveyance passage 20. More specifically, the sensing position DP of the thickness sensor TS is located upstream, in the document conveyance direction, of the reading position RP1 in the document conveyance passage 20. The transmitter and the receiver of the thickness sensor TS are disposed opposite each other across an interval. The document D being conveyed passes between the transmitter and the receiver.

Based on the output of the thickness sensor TS, the control section 4 senses the thickness of the document D fed to the document conveyance passage 20. The control section 4 completes thickness sensing on the document D before the leading edge of the document D reaches the branch position P; it may instead complete thickness sensing on the document D before the leading edge of the document D reaches the reading position RP1.

Thickness sensing on the document D may be performed on the document tray 200.

For example, a conveying-reading job in the second mode often takes as the reading target a document D of a particular type such as a cardboard sheet or a plastic card. That is, in a conveying-reading job in the second mode, only one document D is typically placed on the document tray 200. Accordingly, for a conveying-reading job in the second mode, when the lift plate 24 is raised to bring the document D into contact with the sheet feed roller 23, the control section 4 measures the lift time after the lift plate 24 starts rising until the document D makes contact with the sheet feed roller 23. Then, based on the lift time, the control section 4 senses the thickness of the document D. The thicker the document D, the shorter the lift time.

A conveyance sensor FS is also connected to the control section 4. The conveyance sensor FS changes it output value according to how the document D is being conveyed in the document conveyance passage 20. Any number of conveyance sensors FS may be provided. For example, conveyance sensors FS are provide at a plurality of places along the document conveyance passage 20.

The conveyance sensor FS is a transmissive optical sensor having a light-emitting element and a light-receiving element. The sensing target of the conveyance sensor FS is an actuator. When the leading edge of the document D reaches the sensing position of the conveyance sensor FS, pressed by the document D the actuator rotates in one direction to shield (or open) the optical path between the light-emitting element and the light-receiving element of the conveyance sensor FS. When the trailing edge of the document D passes across the sensing position of the conveyance sensor FS, the actuator rotates in the other direction to open (or shield) the optical path of the conveyance sensor FS. Thus, the conveyance sensor FS outputs a value according to the presence or absence of a document D at the corresponding sensing position.

Based on the output of the conveyance sensor FS, the control section 4 senses how the document D is being conveyed in the document conveyance passage 20. Specifically, the control section 4 senses the arrival of the leading edge of the document D at the sensing position. The control section 4 also senses the passage of the trailing edge of the document D at the sensing position.

Moreover, based on the output of the conveyance sensor FS, the control section 4 senses whether a jam has occurred with the document D in the document conveyance passage 20. When a jam occurs in the document conveyance passage 20, the control section 4 stops the conveying-reading job (the conveyance of the document D by the document conveyance unit 2). After that, the user removes the document D jammed in the document conveyance passage 20.

During a conveying-reading job, when the leading edge of the document D is sensed at the sensing position (referred to as the first position) of a conveyance sensor FS, the control section 4 starts to count time. The control section 4 also senses, at the sensing position (referred to as the second position) of another conveyance sensor FS disposed downstream of the first position in the document conveyance direction, the arrival at the second position of the leading edge of the document D being conveyed from the first position to the second position. If it is found that the leading edge of the document D does not reach the second position at the lapse of a jam-sensing margin time after the theoretically predicted arrival time of the leading edge of the document D at the second position, the control section 4 judges that a jam has occurred.

On the other hand, during a conveying-reading job, if it is found that the leading edge of the document D does not reach a predetermined position (a position downstream, in the document conveyance direction, of where a predetermined roller member is disposed), at the lapse of a predetermined time after the predetermined roller member starts to rotate, the control section 4 stops the rotation of the predetermined roller member. After that, the control section 4 retries the conveyance of the document D with the predetermined roller member. Then, if the leading edge of the document D does not reach the predetermined position even when the number of times of retrial of the conveyance of the document D by the predetermined roller member reaches a predefined upper-limit number of times, the control section 4 judges that a jam has occurred.

For example, the predetermined roller member is the sheet feed roller 23. The predetermined position is, among the sensing positions of a plurality of conveyance sensors FS, the position that the leading edge of the document D fed to the document conveyance passage 20 reaches first.

A cover sensor CS is connected to the control section 4. The cover sensor CS changes its output value according to whether the second discharge tray 202 is in the open or closed position. For example, the cover sensor CS is a transmissive optical sensor having a light-emitting element and a light-receiving element. When the second discharge tray 202 is in the open position, an interceptor provided on the second discharge tray 202 shields (or opens) the optical path between the light-emitting element and the light-receiving element of the cover sensor CS. When the second discharge tray 202 is in the closed position, the interceptor on the second discharge tray 202 opens (or shields) the optical path between the light-emitting element and the light-receiving element of the cover sensor CS.

Based on the output of the cover sensor CS, the control section 4 senses whether the second discharge tray 202 is in the open or closed position (the open/closed state of the second discharge tray 202). That is, based on the output of the cover sensor CS, the control section 4 senses whether the discharge port 20C of the document conveyance passage 20 is closed by the second discharge tray 202.

The multifunction peripheral 100 includes an operation panel 6. The operation panel 6 has a touch screen. The touch screen displays a screen with software buttons on it, and receives touch operations by the user on the display screen. The operation panel 6 has a plurality of hardware buttons. The plurality of hardware buttons include a Start button for receiving an instruction to perform a job from the user.

The operation panel 6 is connected to the control section 4. The control section 4 controls the display operation of the operation panel 6. The control section 4 also senses operations performed on the operation panel 6. When the operation panel 6 receives an instruction to perform a job, the control section 4 performs the job. When the job for which the instruction has been received is a conveying-reading job, the control section 4 makes the document conveyance unit 2 convey the document D to be read in the conveying-reading job (i.e., the document D placed on the document tray 200).

The multifunction peripheral 100 includes a communication section 7. The communication section 7 includes a communication circuit. The communication section 7 is connected to, so as to be able to communicate with, an external apparatus 200 across a network NT. The external apparatus 200 is, for example, a personal computer (user terminal), a server, or a facsimile machine.

The communication section 7 is connected to the control section 4. Via the communication section 7, the control section 4 exchange data with the external apparatus 200; it can, for example, transmit the image data of the document D acquired in a reading job to the external apparatus 200.

<Setting a Reading Job>

The operation panel 6 receives settings related to a conveying-reading job from the user. Various settings are received, such as settings for reading resolution, reading size, and whether to enable duplex reading.

Here, the operation panel 6 receives, as settings related to a conveying-reading job, a setting (path setting) of which of the first and second conveyance paths R1 and R2 to use in the conveying-reading job. The default conveying path is the first conveyance path R1.

The operation panel 6 also receives, as settings related to a conveying-reading job, a setting (type setting) for what type of document D to read in the conveying-reading job. For example, a plurality of types of documents, such as regular paper, cardboard sheets, plastic cards, business cards, and glossy paper, are associated with predefined different thicknesses (basis weights) respectively. As a type setting, one of those types is set as the reading target. The default type is regular paper.

<Displaying a Warning Message>

If, in a conveying-reading job in the first mode (a job in which the document D is conveyed along the first conveyance path R1, which is curved substantially in a U-shape), a document D of a particular type, such as a cardboard sheet or a plastic card, is the reading target, conveying the document D is prone to encounter a failure.

For example, compared with a conveying-reading job in the second mode (a job where the document D is conveyed along the second conveyance path R2, which extends rectilinearly), the document D is likely to develop a fold line. As the case may be, the document D may be folded. That is, the document D is prone to be damaged.

Moreover, being stiff, the document D is not conveyed smoothly. As a result, the document D may reach its reading position with delayed timing, and part of the document D may be left unread, thus causing a reading failure (poor read image quality). Further more, a jam is likely.

To cope with that, before performing a conveying-reading job, the control section 4 checks whether a warning condition is met. If the warning condition is met, before performing the conveying-reading job, the control section 4 makes the operation panel 6 display a warning message MS1 (see FIG. 6).

Figure 5:
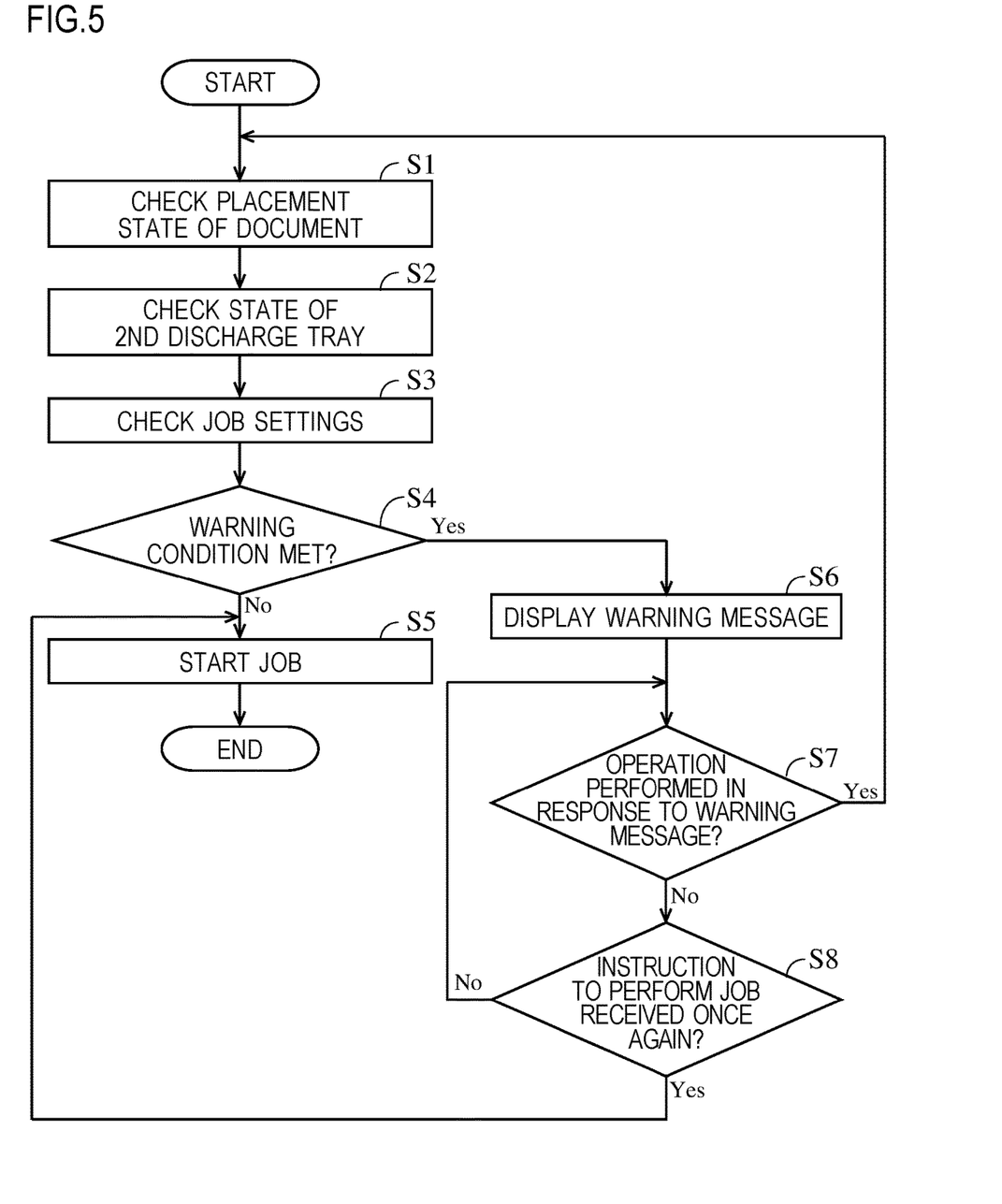
FIG. 5 is a flow chart of a procedure performed before performing a job by the multifunction peripheral according to the embodiment of the present invention.

Now, with reference to the flow chart in FIG. 5, a description will be given of a procedure that the control section 4 performs before performing a conveying-reading job. The procedure shown in FIG. 5 starts when the operation panel 6 receives an instruction to perform a conveying-reading job from the user.

At step S1, based on the output from the set sensor SS, the control section 4 checks the placement state of the document D. In other words, the control section 4 checks whether a job document D as the document D to be read while being conveyed in the conveying-reading job is placed on the document tray 200.

At step S2, based on the output of the cover sensor CS, the control section 4 checks the state of the second discharge tray 202. In other words, the control section 4 checks the open/closed state of the second discharge tray 202. In yet other words, the control section 4 checks whether the discharge port 20C of the document conveyance passage 20 is closed.

At step S3, the operation panel 6 checks the settings for the conveying-reading job that the operation panel 6 has received from the user. The control section 4 checks what are set as the passage setting and the type setting.

Specifically, the control section 4 checks which of the first and second conveyance paths R1 and R2 the operation panel 6 has received the instruction to use. In other words, the control section 4 checks in which of the first and second modes the operation panel 6 has received the instruction to perform the conveying-reading job.

For example, when receiving a passage setting, the operation panel 6 receives from the user a mode selection operation to choose one of the first and second modes. The control section 4 recognizes that it has received an instruction to perform a conveying-reading job in the mode chosen by the mode selection operation. If no mode selection operation is received, the control section 4 recognizes that it has received an instruction to perform a conveying-reading job in the first mode, which is the default mode.

The control section 4 also checks which of a plurality of predefined types the job document D is of. Out of those types, the control section 4 recognizes the thickness (basis weight) associated with the set type as the thickness of the job document D.

For example, when receiving a type setting, the operation panel 6 receives from the user a type selection operation to select one of the plurality of types. The control section 4 recognizes as the thickness of the job document D the thickness (basis weight) associated with the type selected by the type selection operation. If no type selection operation is received, the control section 4 recognizes the job document D as regular paper (the default type).

Generally, if the job document D is of a particular type (such as a cardboard sheet or a plastic card) other than regular paper, the user performs a type selection operation to specify the type (thickness) of the job document D. Depending on the user, however, even if the job document D is of a particular type, he may not perform a type selection operation. That is, it may occur that, even though the job document D is a cardboard sheet, a plastic card, or the like, the control section 4 recognizes the job document D as regular paper.

At step S4, the control section 4 checks whether the warning condition is met. First, the control section 4 checks whether a conveying-reading job can be performed. If a conveying-reading job cannot be performed, the control section 4 judges that the warning condition is met.

Specifically, if no document D is placed on the document tray 200, a conveying-reading job cannot be performed. Accordingly, when no document D is placed on the document tray 200, the control section 4 judges that the warning condition is met.

Or, when a conveying-reading job is performed in the second mode (when the job document D is conveyed along the second conveyance path R2), if the discharge port 20C of the document conveyance passage 20 is closed by the second discharge tray 202, the job document D cannot be discharged. That is, a conveying-reading job cannot be performed. Accordingly, if despite a setting to use the second conveyance path R2 having been made the discharge port 20C is closed by the second discharge tray 202, the control section 4 judges that the warning condition is met.

Here, the control section 4 checks whether performing the conveying-reading job under the current conditions is likely to cause a failure in the conveyance of the document D. If a failure in the conveyance of the document D is likely, the control section 4 judges that the warning condition is met.

Specifically, when the job document D is of a particular type, using the first conveyance path R1 as the conveyance passage for the job document D may cause damage to the job document D, a failure in reading the job document D, a jam with the job document D, or the like. To avoid that, when the job document D is of a particular type, if a setting to use the first conveyance path R1 has been made, the control section 4 judges that the warning condition is met.

Or, when the job document D is of a particular type, even if a setting to use the second conveyance path R2 has been made, if the discharge port 20C is closed by the second discharge tray 202, the control section 4 judges that the warning condition is met.

Thus, when the job document D is of a particular type, if a setting to use the second conveyance path R2 has been made, and in addition if the discharge port 20C is not closed by the second discharge tray 202, the control section 4 judges that the warning condition is not met.

Incidentally, if a setting to use the second conveyance path R2 has been made, and in addition if the discharge port 20C is not closed by the second discharge tray 202, then irrespective of the type of the job document D, the control section 4 judges that the warning condition is not met.

Or, even if a setting to use the first conveyance path R1 has been made, if the job document D is not of a particular type, the control section 4 judges that the warning condition is not met.

If, at step S4, the control section 4 judges that the warning condition is not met, an advance is made to step S5. At step S5, the control section 4 starts the conveying-reading job.

Figure 6:
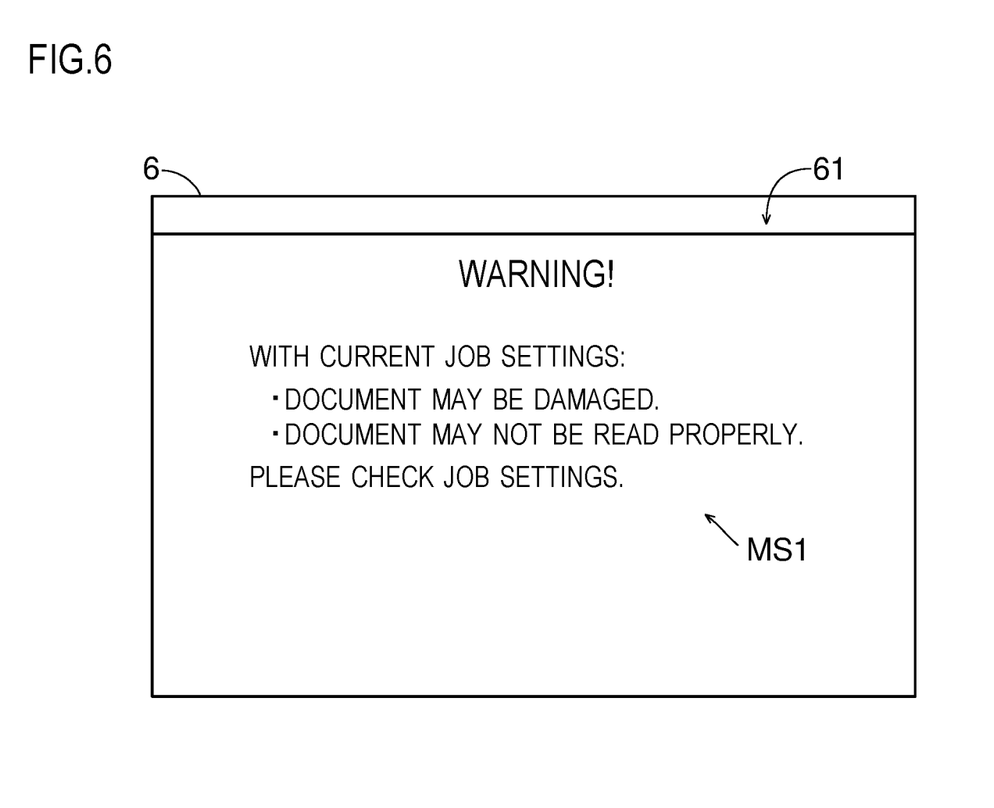
FIG. 6 is a diagram showing a warning screen displayed on the multifunction peripheral according to the embodiment of the present invention.

If, at step S4, the control section 4 judges that the warning condition is met, an advance is made to step S6. At step S6, the control section 4 makes the operation panel 6 display a warning screen 61 as shown in FIG. 6. The warning screen 61 shows the warning message MS1.

The warning message MS1 shown in FIG. 6 appears when the job document D is of a particular type and in addition a setting to use the first conveyance path R1 has been made. In this case, the warning message MS1 is worded to include, for example, a message indicating that the job document D may be damaged or a message indicating that the job document D may not be read properly. Or the warning message MS1 is worded to include a message prompting the user to check the settings for the conveying-reading job.

Though not illustrated, if no document D is placed on the document tray 200, a message prompting the user to check the placement state of the document D is displayed as the warning message MS1. If despite a setting to use the second conveyance path R2 having been made the discharge port 20C is closed by the second discharge tray 202, a message prompting the user to check the state of the second discharge tray 202 (discharge destination) is displayed as the warning message MS1.

Referring back to FIG. 5, after the display of the warning message MS1, an advance is made to step S7. Here, after seeing the warning message MS1, the user takes some measure if necessary. For example, if a warning message MS1 as shown in FIG. 6 is displayed, the user reviews the job settings and changes the conveyance passage to be used from the first conveyance path R1 to the second conveyance path R2. If a message prompting the user to check the placement state of the document D is displayed, the user places a document D on the document tray 200. When the control section 4 recognizes any such operation (operation in response to what is displayed as the warning message MS1) being performed, an advance is made to step S1.

Depending on the user, even after seeing the warning message MS1, he may choose not to perform operation in response to the warning message MS1 but to enter once again an instruction to perform a conveying-reading job. In that case, an advance is made from step S7 to step S8.

For example, at step S8, the control section 4 checks whether the operation panel 6 has received from the user an instruction to perform a conveying-reading job once again. If the control section 4 finds that the operation panel 6 has received an instruction to perform a conveying-reading job, an advance is made to step S5; if the control section 4 finds that the operation panel 6 has not received an instruction to perform a conveying-reading job, an advance is made to step S6.

An advance from step S8 to step S5 starts the conveying-reading job under conditions where the conveyance of the job document D is likely to encounter a failure.

Incidentally, if with no document D placed on the document tray 200 an instruction to perform a conveying-reading job is entered, after the receipt of the instruction, an error message indicating that no document D is placed is displayed. If despite a setting to use the second conveyance path R2 having been made the second discharge tray 202 is closed and in that state an instruction to perform a conveying-reading job is entered, after the receipt of the instruction, an error message indicating that the second discharge tray 202 is closed is displayed.

<Preventing Jams>

Even when the job document D to be read in a conveying-reading job is of a particular type (such as a cardboard sheet or a plastic card), the first conveyance path R1 can be used; that is, the conveying-reading job can be performed in the first mode. In that case, a jam is likely. The likelihood of a jam increases with increase of the thickness of the job document D compared with regular paper.

To cope with that, after the start of the conveying-reading job, the control section 5 checks whether a jam is likely. If a jam is likely, the control section 4 changes a document conveyance condition, jam sensing condition, or other condition to prevent a jam.

Figure 7:
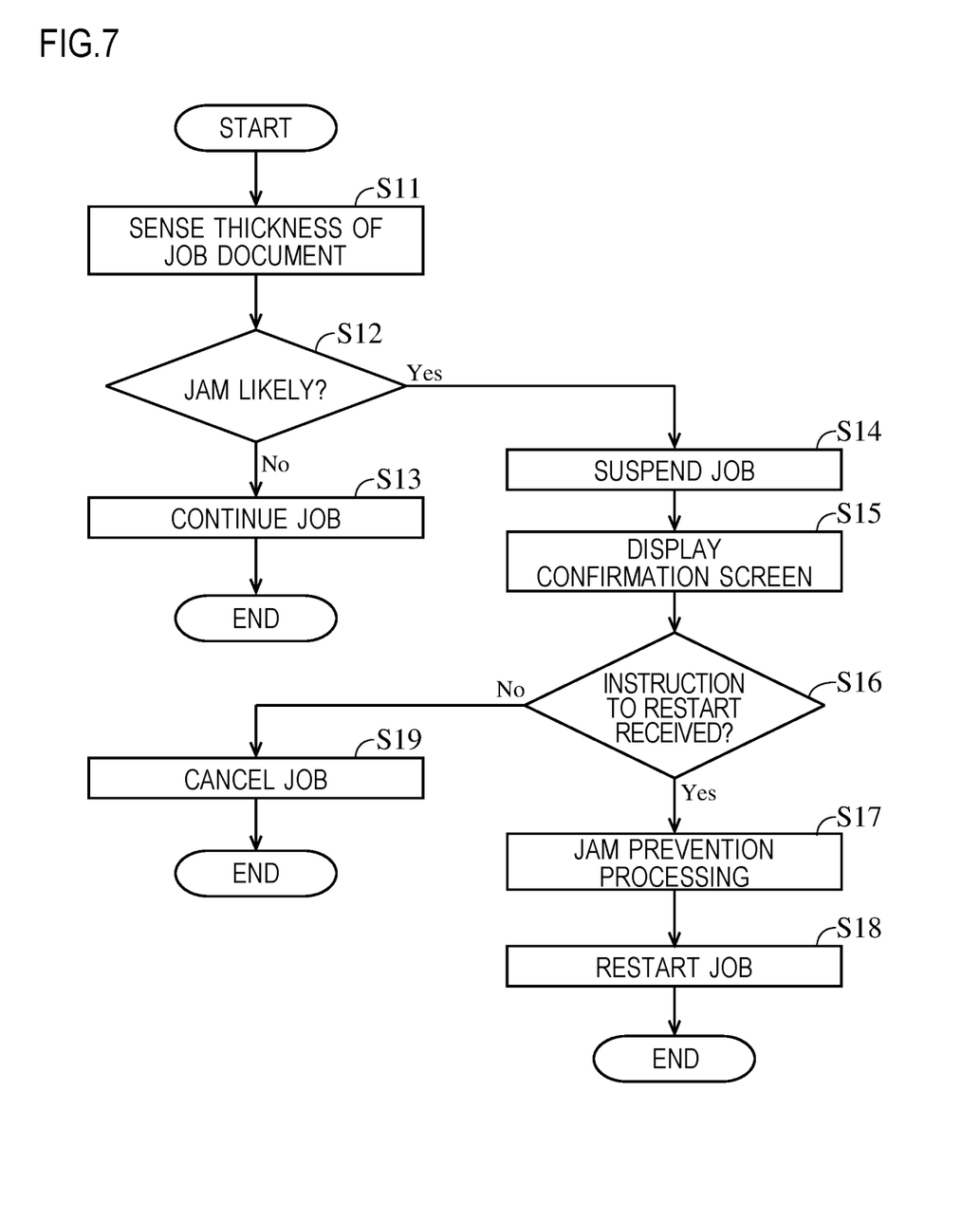
FIG. 7 is a flow chart of a procedure performed before performing a job by the multifunction peripheral according to the embodiment of the present invention.

Now, with reference to the flow chart in FIG. 7, a description will be given of a procedure that the control section 4 performs after the start of a conveying-reading job. The procedure shown in FIG. 7 starts when a conveying-reading job starts, that is, when a job document D is fed from the document tray 200 to the document conveyance passage 20.

At step S11, based on the output of the thickness sensor TS, the control section 4 senses the thickness of the job document D. Here, the thickness (basis weight) associated with the type of the job document D as set by the user does not always agree with the thickness of the job document D as sensed based on the output of the thickness sensor TS (hereinafter referred to as the sensed thickness).

At step S12, based on the sensed thickness, the control section 4 checks whether a jam is likely. Any method can be used to check for the likelihood of a jam.

For example, the likelihood of a jam increases with increase of the thickness of the job document D compared with regular paper. Also, the likelihood of a jam is greater when the first conveyance path R1 is used than when the second conveyance path R2 is used. Accordingly, in a conveying-reading job for which a setting to use the first conveyance path R1 has been made, if the thickness of the job document D is sensed to be equal to or larger than a predetermined thickness, the control section 4 judges that a jam is likely.

Seeing that the likelihood of a jam increases with increase of the thickness of the job document D, it is also possible to judge, regardless of the conveying passage for the job document D, that a jam is likely if the sensed thickness of the job document D is equal to or larger than the predetermined thickness.

It is also possible to judge that a jam is likely if the leading edge of the job document D reaches the sensing position of any conveyance sensor FS with a delay (within a permissible range).

If, at step S12, the control section 4 judges that a jam is unlikely, an advance is made to step S13. At step S13, the control section 4 continues with the conveying-reading job with no jam prevention processing such as changing a document conveyance condition, jam sensing condition, or other condition.

If, at step S12, the control section 4 judges that a jam is likely, an advance is made to step S14. At step S14, the control section 4 suspends the conveying-reading job. That is, the control section 4 stops the conveyance of the job document D by the document conveyance unit 2.

Figure 8:
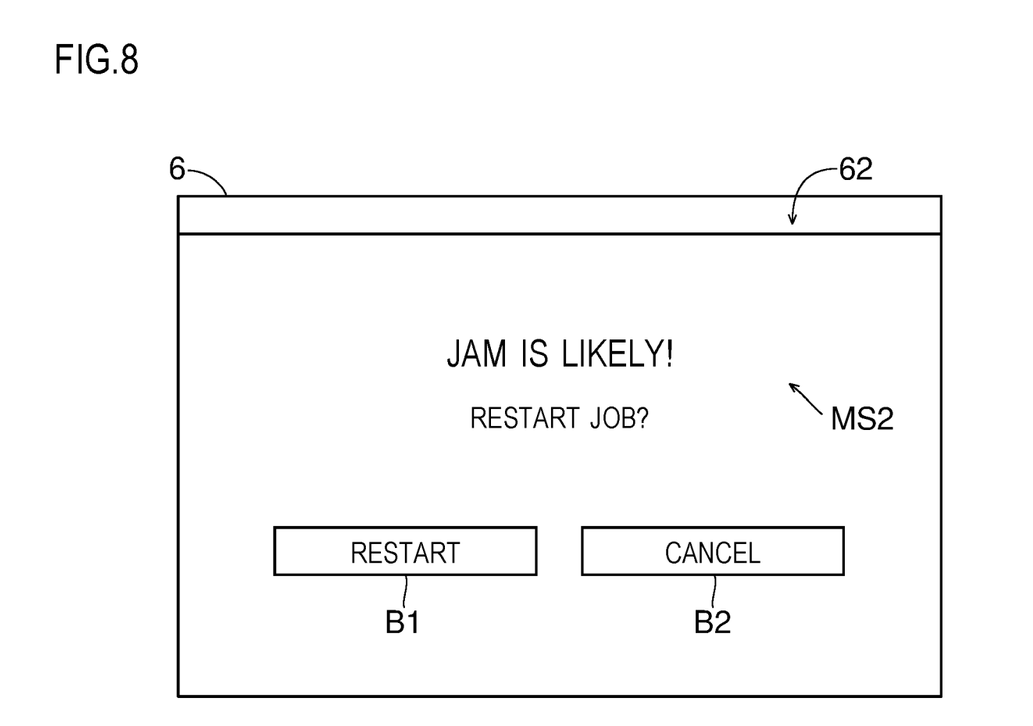
FIG. 8 is a diagram showing a confirmation screen displayed on the multifunction peripheral according to the embodiment of the present invention.

Then, at step S15, the control section 4 makes the operation panel 6 display a confirmation screen 62 as shown in FIG. 8. The confirmation screen 62 shows a message MS2 indicating that a jam is likely. The confirmation screen 62 also shows a Restart button B1 and a Cancel button B2.

On sensing the Restart button B1 being operated, the control section 4 judges that the operation panel 6 has received from the user an instruction to restart the suspended conveying-reading job. By contrast, on sensing the Cancel button B2 being operated, the control section 4 judges that the operation panel 6 has received from the user an instruction to cancel the suspended conveying-reading job.

Referring back to FIG. 7, at step S16, the control section 4 checks whether the operation panel 6 has received an instruction to restart the conveying-reading job. If the control section 4 judges that an instruction to restart the conveying-reading job has been received, an advance is made to step S17.

At step S17, the control section 4 performs jam prevention processing. As the jam prevention processing, the control section 4 performs at least either first processing or second processing. The first processing is processing whereby changes the conveyance speed of the job document D is changed. The second processing is processing whereby a jam sensing setting is changed.

Here, the likelihood of a jam with the job document D decreases with decrease of the conveyance speed of the job document D. Accordingly, as the first processing, the control section 4 makes the conveyance speed of the job document D lower than before the suspension of the conveying-reading job.

Moreover, as the second processing, the control section 4 makes the jam-sensing margin time longer than before the suspension of the conveying-reading job. Furthermore, the control section 4 makes the upper-limit number of times of retrial larger than before the suspension of the conveying-reading job. Performing the second processing makes jams less likely to be sensed.

Incidentally, performing the first processing delays the timing with which the leading edge of the job document D reaches the sensing position of each conveyance sensor FS. To cope with that, when performing the first processing, the control section 4 also performs the second processing. The second processing alone may be performed without the first processing being performed. To prevent jams, however, it is preferable to reduce the conveyance speed of the job document D.

At step S18, the control section 4 restarts the suspended conveying-reading job. In the restarted conveying-reading job, the conveyance speed of the job document D is lower than before its suspension. Moreover, the jam-sensing margin time is longer, and the upper-limit number of times of retrial is greater.

If, at step S16, the control section 4 judges that an instruction not to restart the conveying-reading job (an instruction to cancel the conveying-reading job) has been received, the control section 4 cancels the conveying-reading job.

As described above, a multifunction peripheral 100 according to the embodiment has an operation panel 6 for receiving settings for a conveying-reading job and a document conveyance passage 20 for guiding the conveyance of a job document D, and includes a document conveyance unit 2 for feeding the job document D to the document conveyance passage 20 to convey the job document D and a control section 4 for controlling the conveying-reading job according to the settings for the conveying-reading job received by the operation panel 6. The conveyance path for the job document D is either a first conveyance path R1 extending from one side to the other side and then turning midway to extend back to the one side and a second conveyance path extending rectilinearly without turning back midway.

Here, when the job document D is of a particular type (such as a cardboard sheet or a plastic card), if the job document D is conveyed along the first conveyance passage R1, the job document D may be damaged. Or the job document D may reach its reading position with delayed timing and fails to be read properly.

To avoid that, when the job document D is of a particular type other than regular paper, if a setting to use the first conveyance passage R1 has been made, before performing the conveying-reading job, the control section 4 makes the operation panel 6 display a warning message MS1. Seeing the warning message MS1, the user revises the job settings, That is, the setting for the conveyance path for the job document D is changed from the first conveyance passage R1 to the second conveyance passage R2. It is thus possible to prevent damage to the job document D. It is also possible to prevent a reading failure. It is further possible to make a jam with the job document D unlikely.

Moreover, according to the embodiment, as described above, when the job document D is of a particular type, even if a setting to use the second conveyance passage R2 has been made, if the second discharge tray 202 is closed (if the discharge port 20C of the document conveyance passage 20 is closed), before performing the conveying-reading job, the control section 4 makes the operation panel 6 display the warning message MS1. It is thus possible to let the user recognize that the conveying-reading job cannot be performed (the discharge port 20C of the document conveyance passage 20 is closed). Seeing the warning message MS1, the user opens the second discharge tray 202 so that the conveying-reading job can be performed.

Moreover, according to the embodiment, as described above, if a setting to use the second conveyance passage R2 has been made and in addition if the second discharge tray 202 is open, the control section 4 does not have the warning message MS1 displayed. It is thus possible to avoid the warning message MS1 being displayed unnecessarily.

Moreover, according to the embodiment, as described above, after starting the conveying-reading job, the control section 4 checks whether a jam with the job document D is likely. On judging that a jam is likely, the control section 4 suspends the conveying-reading job, and makes the operation panel 6 receive an instruction to restart or cancel the conveying-reading job. With this configuration, it is possible to recognize whether a jam is likely and, if one is likely, to immediately cancel the conveying-reading job. This is convenient to the user.

In this configuration, when the operation panel 6 receives an instruction to restart the conveying-reading job, the control section 4 performs jam prevention processing and then restarts the conveying-reading job. It is thus possible, when restarting the conveying-reading job, to perform jam prevention processing automatically with no additional settings. This is convenient to the user.

When restarting the conveying-reading job, the control section 4 makes the conveyance speed of the job document D lower than before the suspension of the conveying-reading job. The control section 4 also makes the jam-sensing margin time longer than before the suspension of the conveying-reading job. The control section 4 also makes the upper-limit number of times of retrial larger than before the suspension of the conveying-reading job. It is thus possible to reduce the likelihood of jams easily.

Moreover, according to the embodiment, as described above, the control section 4 checks whether a jam is likely based on the thickness of the job document D. Specifically, in a conveying-reading job for which a setting to use the first conveyance passage R1 has been made, if the thickness of the job document D is sensed to be equal to or greater than a predetermined thickness, the control section 4 judges that a jam is likely. This configuration helps enhance the accuracy of judgement of whether a jam is likely.

The embodiments disclosed herein are to be understood to be in every aspect illustrative and not restrictive. The scope of the present invention is defined not by the description of the embodiments given above but by the appended claims, and encompasses any modifications made within a scope and sense equivalent to those claims.

The invention claimed is:

1. An image reading apparatus comprising:
an operation panel for receiving settings for a reading job whereby a document is read to generate image data;
a document conveyance unit having a document conveyance passage for guiding a job document to be read in the reading job, the document conveyance unit feeding the job document to the document conveyance passage to convey the job document;
a cover; and
a control section for controlling the reading job according to the settings for the reading job received by the operation panel,
wherein
a conveyance path for the job document is either
a first conveyance path extending from one side to another side and then turning midway to extend back to the one side or
a second conveyance path extending rectilinearly without turning back midway,
when the lob document is of a particular type other than regular paper, if a setting to use the first conveyance path has been made, before performing the reading job, the control section makes the operation panel display a warning message
wherein the cover is openably provided on the document conveyance unit, the cover, when closed, closing a discharge port of the second conveyance path, wherein
when the job document is of the particular type, even if a setting to use the second conveyance path has been made, if the cover is closed, before performing the reading job, the control section makes the operation panel display the warning message.

2. The image reading apparatus according to claim 1,
if a setting to use the second conveyance path has been made, and in addition if the cover is open, the control section does not have the warning message displayed.

3. An image reading apparatus comprising:
an operation panel for receiving settings for a reading job whereby a document is read to generate image data;
a document conveyance unit having a document conveyance passage for guiding a job document to be read in the reading job, the document conveyance unit feeding the job document to the document conveyance passage to convey the job document;
a cover; and
a control section for controlling the reading iob according to the settings for the reading job received by the operation panel,
wherein
a conveyance path for the iob document is either
a first conveyance path extending from one side to another side and then turning midway to extend back to the one side or
a second conveyance path extending rectilinearly without turning back midway,
when the job document is of a particular type other than regular paper, if a setting to use the first conveyance path has been made, before performing the reading job, the control section makes the operation panel display a warning message;
after starting the reading job, the control section checks whether a jam with the job document is likely and, on judging that the jam is likely, the control section suspends the reading job and makes the operation panel receive an instruction to restart or cancel the reading job.

4. The image reading apparatus according to claim 3,
when the operation panel receives an instruction to restart the reading job, the control section makes a conveyance speed of the job document lower than before suspension of the reading job and restarts the reading job.

5. The image reading apparatus according to claim 3,
if a leading edge of the job document conveyed from a first position to a second position along the document conveyance passage does not reach the second position even at a lapse of a margin time after a theoretically predicted arrival time of its arrival there, the control section judges that the jam has occurred, and
when the operation panel receives an instruction to restart the reading job, the control section makes the margin time longer than before suspension of the reading job and restarts the reading job.

6. The image reading apparatus according to claim 3,
further comprising a roller member for rotating and thereby conveying the job document to a predetermined position along the document conveyance passage, wherein
if a leading edge of the job document does not reach the predetermined position even at a lapse of a predetermined time after the roller member starts to convey the job document, the control section stops rotation of the roller member and retries conveyance of the job document by the roller member, and if the leading edge of the job document does not reach the predetermined position even when a number of times of retrial of conveyance of the job document by the roller member reaches an upper-limit number of times, the control section judges that the jam has occurred, and when the operation panel receives an instruction to restart the reading job, the control section makes the upper-limit number of times larger than before suspension of the reading job and restarts the reading job.

7. The image reading apparatus according to claim 3, further comprising a thickness sensor for sensing a thickness of the job document fed to the document conveyance passage, wherein based on the thickness of the job document, the control section checks whether the jam is likely.

8. The image reading apparatus according to claim 7, in a reading job for which a setting to use the first conveyance path has been made, if the thickness of the job document is sensed to be equal to or larger than a predetermined thickness, the control section judges that the jam is likely.

\* \* \* \* \*